United States Patent

Rückert et al.

[11] Patent Number: 6,085,636
[45] Date of Patent: Jul. 11, 2000

[54] BRAKE PISTON

[75] Inventors: Helmut Rückert, Reinheim; Alfred Birkenbach, Hattersheim; Nabil Henein, Darmstadt, all of Germany

[73] Assignee: ITT Manufacturing Enterprises Inc., Wilmington, Del.

[21] Appl. No.: 09/029,803

[22] PCT Filed: Aug. 6, 1996

[86] PCT No.: PCT/EP96/03476

§ 371 Date: May 14, 1998

§ 102(e) Date: May 14, 1998

[87] PCT Pub. No.: WO97/10450

PCT Pub. Date: Mar. 20, 1997

[30] Foreign Application Priority Data

Sep. 15, 1995 [DE] Germany ............... 195 34 220

[51] Int. Cl.[7] ............................................. F16J 1/01
[52] U.S. Cl. ............................................. 92/254
[58] Field of Search ............................... 92/212, 254

[56] References Cited

U.S. PATENT DOCUMENTS

| 2,216,577 | 10/1940 | Stillwagon | 92/254 |
|---|---|---|---|
| 2,663,285 | 12/1953 | Johnson | 92/254 |
| 2,791,969 | 5/1957 | Berliner | 92/254 |
| 2,887,347 | 5/1959 | Losey | 92/254 |
| 3,172,341 | 3/1965 | Garrett | 92/254 |
| 4,170,926 | 10/1979 | Emmett . | |
| 4,190,108 | 2/1980 | Webber | 92/254 |
| 4,545,288 | 10/1985 | Burke | 92/254 |
| 4,605,104 | 8/1986 | Thompson . | |
| 4,928,579 | 5/1990 | Emmett . | |

FOREIGN PATENT DOCUMENTS

| 2711692 | 9/1977 | Germany . |
|---|---|---|
| 3119921 | 4/1982 | Germany . |
| 3308711 | 9/1983 | Germany . |
| 3326728 | 2/1984 | Germany . |
| 3629513 | 3/1988 | Germany . |
| 3742237 | 10/1988 | Germany . |
| 4340453 | 6/1995 | Germany . |
| 1474286 | 5/1977 | United Kingdom . |

*Primary Examiner*—F. Daniel Lopez
*Attorney, Agent, or Firm*—Rader, Fishman & Grauer PLLC

[57] ABSTRACT

In a plastic brake piston for a disc brake, the heat conductivity is improved because the brake piston is provided with an insert member made of a metallic material which extends from end to end through the brake piston.

5 Claims, 1 Drawing Sheet

BRAKE PISTON

BACKGROUND OF THE INVENTION

The present invention relates to a plastic brake piston.

German patent application No. 31 19 921 discloses a plastic brake piston having an open end which is thermally reinforced by a coating of heat-resistant material. This avoids a thermal overload of the brake piston which abuts the metallic support plate of a brake lining which can become very hot during braking.

A disadvantage of the prior art arrangement is that the heat of the brake lining is only very poorly dissipated by the brake piston due to the low heat conductivity of the piston. Therefore, the brake lining may become extremely heated in heavy braking operations so that even the lining material will possibly be detached.

An object of the present invention is to provide a plastic brake piston that is improved in terms of heat conductivity.

SUMMARY OF THE INVENTION

The object of the present invention is achieved by a plastic brake piston including a metallic insert member which extends from one end of the brake piston that abuts the brake lining until the second end of the brake piston which is connected to the hydraulic fluid. Part of the heat is carried off from the brake lining via the metallic insert member and conducted to the hydraulic fluid. The solution of the present invention combines the advantage of low manufacturing costs for the plastic brake piston and the good conductivity of a metallic material.

In a simple embodiment of the present invention, the insert member is a metal wire or pin which, most simply, extends precisely from one end of the brake piston to the second end. A pin of this type can be slipped into the brake piston or laminated by the plastic material.

In a second embodiment of the present invention, a cup-shaped insert member is provided and has its base arranged on the second end of the brake piston. The base of the cup-shaped insert member is connected directly to the hydraulic fluid and is acted upon by its hydraulic pressure. In a preferred aspect of the cup-shaped insert member, the base has a thicker design than the side wall to better withstand the hydraulic pressure. The present invention can still be improved by the provision of an inward circumferential bead on the cup-shaped insert member in the area of its side wall, the bead being used for engagement by a holding spring for the brake lining.

In a preferred aspect of the embodiment of the present invention with a cup-shaped insert member, the cup-shaped insert has a stepped configuration. The insert end close to the base has a diameter smaller than the end which is in contact with the brake lining. The so configured cup-shaped insert has a smaller base surface acted upon by the pressure of the hydraulic fluid and, thus, has an improved resistance against the pressure.

In another preferred aspect of the present invention, the insert member is a U-shaped, spray-coated sheet-metal strip or metal wire. The inside of the insert member includes also in this case a projection which can be backgripped by the anti-rattle spring of the brake lining.

Especially in a cup-shaped or U-shaped configuration of the insert member, the contact surfaces of the brake piston and the insert member have grooves and beads on the piston and the insert member which are in engagement. This provides a stronger support of the insert in the brake piston and ensures seal-tightness of the entire piston in relation to the hydraulic fluid.

In still another preferred aspect of the invention, the insert member is a spray-coated helical spring. Any customary standard part can be used in this case.

In another solution of the present invention, the material of the brake piston has metallic additions to increase the heat conductivity.

Embodiments of the present invention will be explained in more detail hereinbelow making reference to the accompanying drawings.

BRIEF DESCRIPTION OF THE INVENTION

DETAILED DESCRIPTION OF THE DRAWINGS

Figure 1:
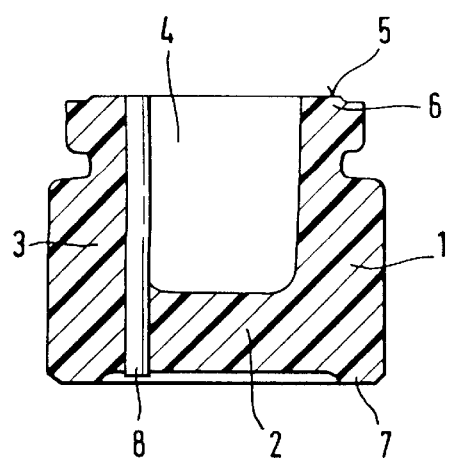
FIG. 1 is a cross-sectional view of a brake piston in a first embodiment with a pin.

A brake piston 1 made of plastic material can be seen in the Figures. The brake piston 1 has a cup-shaped configuration with a base 2 and a wall portion 3. Inside the brake piston 1 is a hollow space 4. The wall portion 3 ends in a front surface 5 which forms a first end 6 of the brake piston 1 and is intended for abutment with a backing plate of a brake lining (not shown) The base 2 forms a second end 7 of the brake piston 1 which is in connection with the hydraulic fluid and is acted upon by the hydraulic pressure.

The brake piston 1 has metallic insert members 8, 9, 10, 11, 12 which extend from its first end 6 to its second end 7 to improve the heat conductivity.

The embodiment shown in FIG. 1 uses a pin 8 as an insert member which is simply slipped into the brake piston 1. Of course, as many pins as desired may be used instead of one single pin 8.

Figure 2:
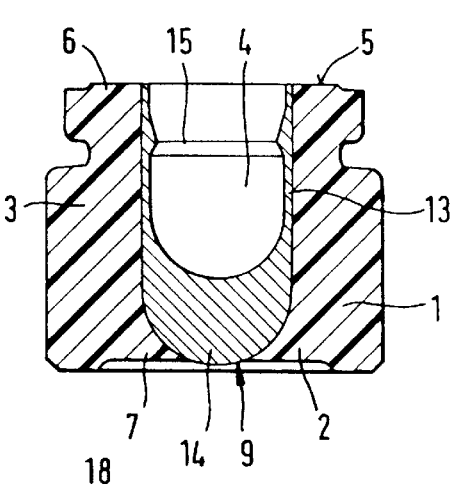
FIG. 2 is a cross-sectional view of a second embodiment of the brake piston with a cup-shaped insert member.

In the embodiment shown in FIG. 2, a cup-shaped insert member 9 is inserted into the hollow space 4 of the brake piston 1. A thin side wall 13 of the cup-shaped insert member 9 is arranged in the area of the wall portion 3 of the brake piston 1, and a thick base 14 of the cup-shaped insert member 9 is arranged in proximity of the base 2 of the brake piston 1. In addition, an annular circumferential bead 15 is configured in the side wall 13. The purpose of the bead 15 is to become engaged by an antirattle spring of the brake lining (not shown).

Figure 3:
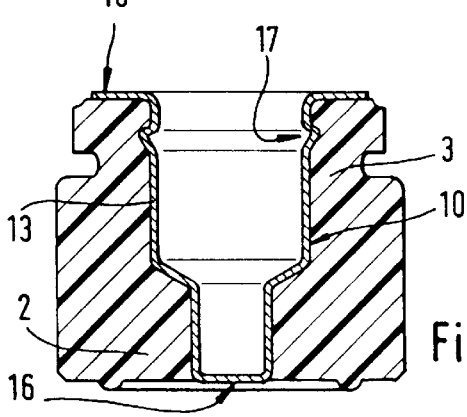
FIG. 3 is a cross-sectional view of a third embodiment of the brake piston with a stepped, cup-shaped insert member.

FIG. 3 shows an improvement of the cup-shaped insert member 10 which has a stepped design. In the base 2 of the brake piston, the cup-shaped insert member has a smaller diameter than in the wall portion 3 of the piston. Thus, the insert with a reduced base surface 14 is exposed to the pressure of the hydraulic fluid. In the area of the inward side wall 13 of the stepped insert cup 10, a circumferential groove 17 is provided. The upper rim 18 of the stepped insert cup 10 is angled off and abuts the end surface 5 of the brake piston. This provides an increased contact surface with respect to the brake lining (not shown).

Figure 4:
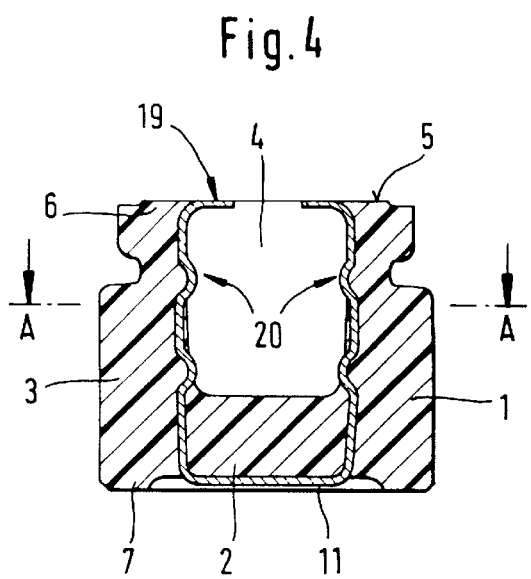
FIG. 4 is a cross-sectional view of a fourth embodiment of the brake piston with a U-shaped sheet-metal strip.
Figure 5:
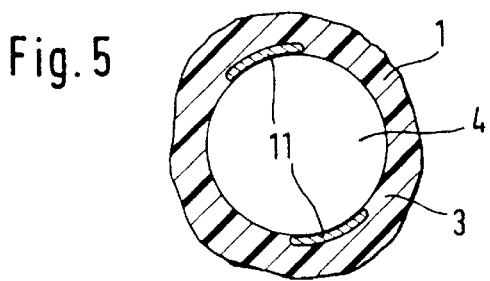
FIG. 5 is a cross-section take n along line A—A in FIG. 4.

In the embodiment shown in FIGS. 4 and 5, the insert member is configured as a U-shaped sheet-metal strip 11 which is arranged partly in the hollow space 4 along the wall portion 3 of the brake piston 1 and partly in the base 2 of the brake piston 1. The ends 19 of the U-shaped sheet-metal strip are angled off and provide the contact surface of the insert member with respect to the brake lining (not shown). On the inside of the hollow space 4 of the piston, the sheet-metal strip 11 has projections 20 which can be back-gripped by an anti-rattle spring of a brake lining.

Figure 6:
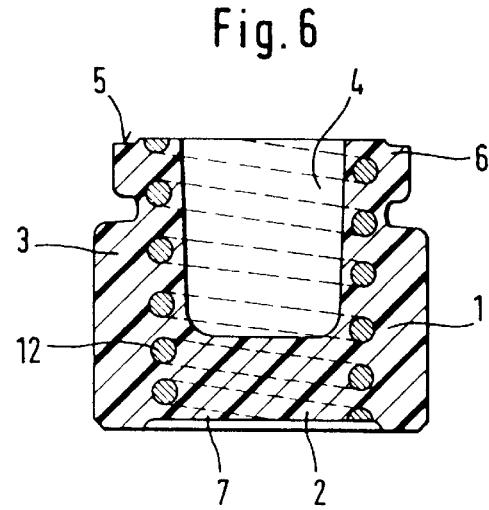
FIG. 6 is a cross-sectional view of another embodiment of the brake piston with a helical spring.

In the embodiment shown in fig. 6, the insert member is a helical spring 12 which is injection molded in the plastic material of the brake piston 1.

What is claimed is:

1. A plastic brake piston for a disc brake, comprising:

a plastic body portion having a first end and a second end; and at least one insert member made of a metallic material supported by the body portion and which extends from the first end to the second end, wherein the insert member has the shape of a cup with a base arranged on the second end of the body portion, the cup including a rim which is bent outwardly and abuts an end surface of the body portion.

2. A plastic brake piston for a disc brake, comprising:

a plastic body portion having a first end and a second end; and at least one insert member supported by the body portion and which extends from the first end to the second end, the insert member being configured as a U-shaped spray-coated sheet-metal strip or metal wire having opposing ends.

3. A brake piston as claimed in claim 2, wherein the ends of the insert member are angled off at the first end of the body portion.

4. A brake piston as claimed in claim 2, wherein the insert member includes at least one projection on the inside of the body portion.

5. A plastic brake piston for a disc brake, comprising:

a plastic body portion having a first end and a second end; and at least one insert member configured as a spray-coated helical spring supported by the body portion and which extends from the first end to the second end.

* * * * *